United States Patent [19]

Burkhart et al.

[11] 4,052,011

[45] Oct. 4, 1977

[54] COMBINATION STACK MOVER AND PROCESSOR

[75] Inventors: Merle Keith Burkhart; Bruce Lynn White; La Vern Roy Goossen, all of Newton; Allen Andrew White, Peabody; Harold William Voth, Newton, all of Kans.

[73] Assignee: Hesston Corporation, Hesston, Kans.

[21] Appl. No.: 653,146

[22] Filed: Jan. 28, 1976

[51] Int. Cl.² ............................................. A01F 29/00
[52] U.S. Cl. ................................. 241/30; 241/101.7; 241/186 R
[58] Field of Search ............. 241/101 A, 101.1, 101.2, 241/101.7, 186 R, 186.4, 190, 27, 28, 30; 214/83.36, 504, 505, 506, 508, 519

[56] References Cited

U.S. PATENT DOCUMENTS

| 2,685,900 | 8/1954 | Cross | 241/101 A |
|---|---|---|---|
| 3,209,932 | 10/1965 | Schiltz | 214/505 |
| 3,863,850 | 2/1975 | Freeman | 241/190 |
| 3,920,190 | 11/1975 | Kanengieter et al. | 241/101.7 |
| 3,979,074 | 9/1976 | White et al. | 241/30 |

*Primary Examiner*—Granville Y. Custer, Jr.
*Attorney, Agent, or Firm*—Schmidt, Johnson, Hovey & Williams

[57] ABSTRACT

A machine for handling large crop masses and the like is presented which permits completely automatic processing of these masses and requires only a single operator to effectively manipulate the machine to perform this function. A tiltable bed having a fore-and-aft conveyor is arranged behind a bank of shredding rolls for engaging ground-supported crop masses, loading the latter to a horizontally support position and then feeding the same horizontally into the rolls. Swingable structure is provided between the rolls and the bed for positive feeding of remnant portions of the masses presented at the end of the feeding cycle. The bed and the processor are releasably connected such that they effectively cooperate as a single machine, yet at the same time may be used individually to perform other unrelated farm tasks.

9 Claims, 5 Drawing Figures

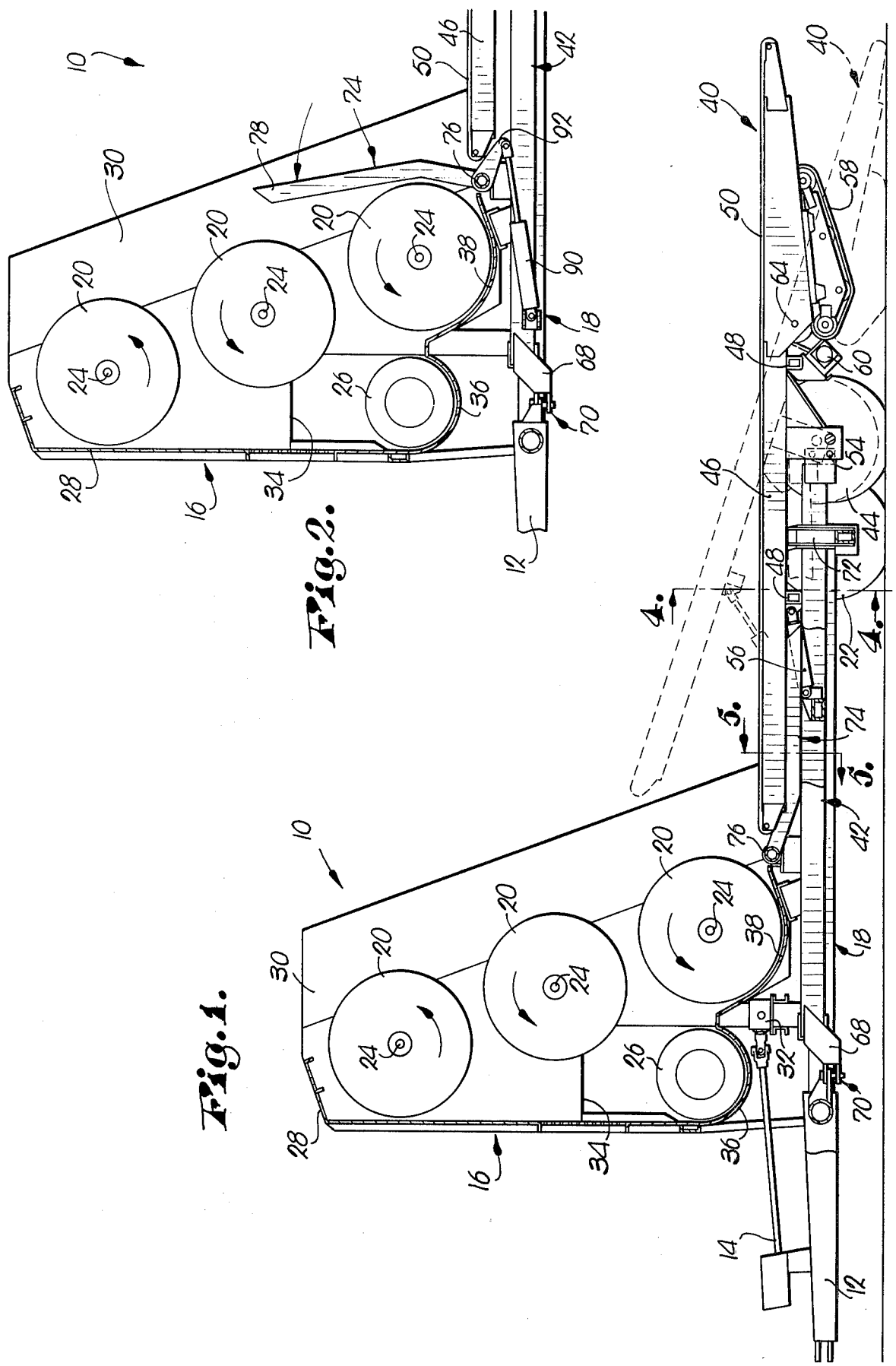

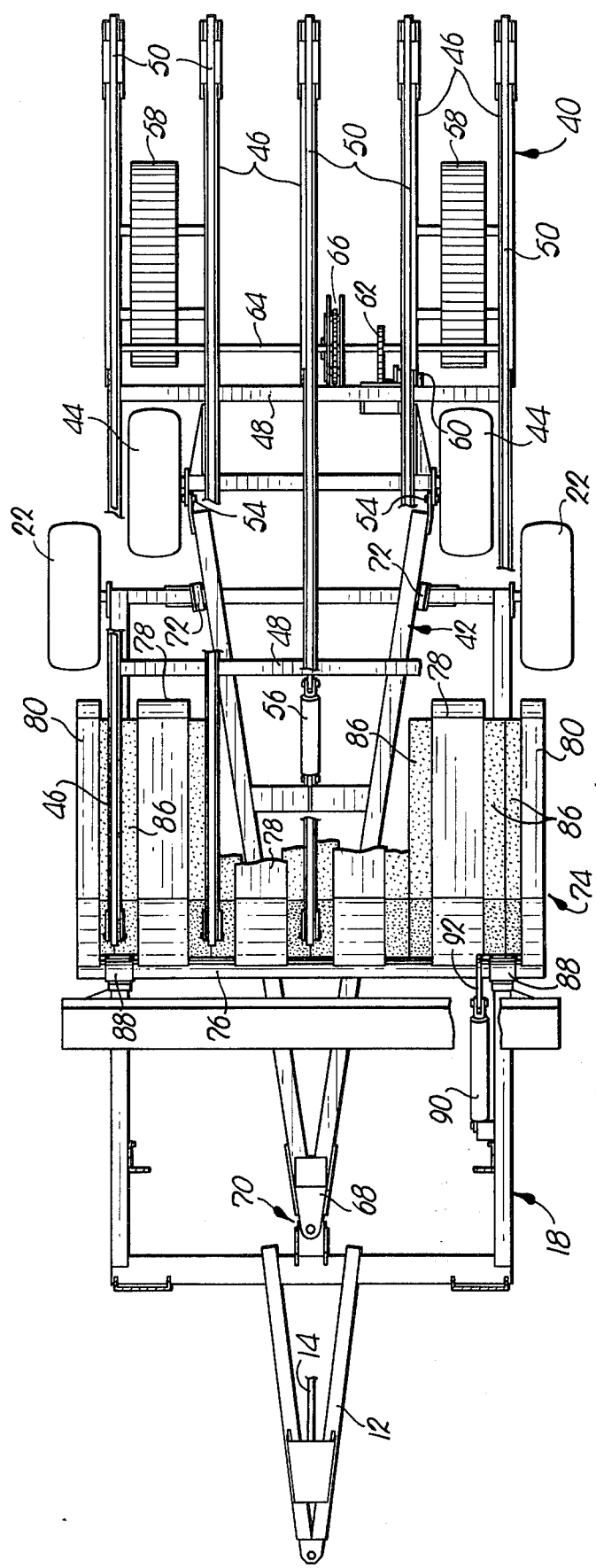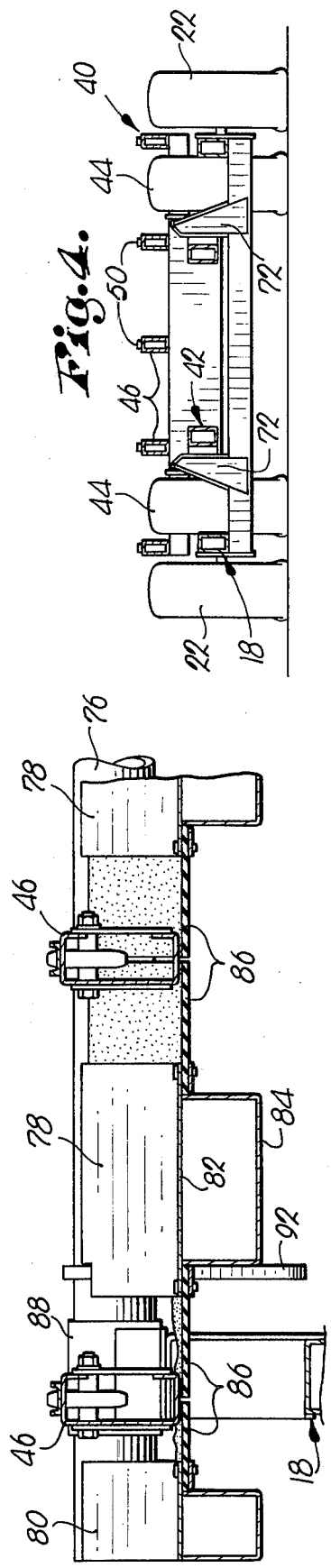

COMBINATION STACK MOVER AND PROCESSOR

Machines for disintegrating and feeding hay stacks to livestock are known in the art as evidenced by U.S. Pat. No. 3,773,269, issued Nov. 20, 1973, and entitled "Continuous Stack Feeder and Method." The machine of this patent includes rotary mechanism for continuously disintegrating a large stack or other mass fed horizontally into the mechanism by a supporting conveyor.

A problem with a machine of this type is a difficulty in automatically processing the entirety of a given crop mass. In this connection, there is a tendency for the last remaining portion of these crop masses to resist further horizontal feeding into the disintegrating mechanism by tipping over rearwardly as the mechanism is encountered. Rearward tipping is caused because the base or supported area of the remaining portion is progressively decreased while the center of gravity remains substantially the same distance from the base, resulting in an increasingly unstable condition. In many instances, the final feeding of the last portion of the crop mass must be accomplished by the operator manually advancing this portion into the disintegrating mechanism.

Tip-over is not a problem in the feeding machines illustrated in U.S. Pat. Nos. 3,741,051 and 3,830,438 even though they use horizontal conveying beds, because there the haystacks are intermittently advanced by the beds into position beneath mechanism that takes successively end slices from the stacks. On the other hand, these machines are not truly continuous in operation.

Another type of crop mass feeding machine is disclosed in the application for U.S. Pat. No. 514,110 filed Oct. 11, 1974, and entitled "Method and Apparatus for Processing Crop Stacks", now U.S. Pat. No. 3,979,074. The machine disclosed in this application has a fork which slips under small ground-lying crop masses and swings the same up and into a forwardly carried bank of shredding rolls. This machine is unsuited for processing extremely large masses of crops (such as haystacks on the order of several tons) because of the very high moment produced at the outer end of the swinging fork.

Another problem common to large crop mass handling devices heretofore available is the fact that these devices are suited for one specialized purpose. Thus, while many of these devices are very effective in processing large crop masses, the same devices are inefficient when the farmer desires to merely move a crop mass or shred smaller units of crop material such as round bales or even conventional square bales.

It will be appreciated that the processing structure of such devices is excess bulk when the machine is being used solely as a stack mover. Similarly, the large horizontal mover apparatus presents a burden to operating efficiency when the machine is only needed to process small units of crop material.

Accordingly, one important object of the present invention is to provide a way to obtain continuous disintegration of a large crop mass throughout its entire length without the exasperation and hardship of having the last remnant of the mass tip over backwards on its horizontal conveyor rather than be fed properly into the disintegrating mechanism.

In accordance with the above, it is another important object of the instant invention to provide a crop mass handling machine, of the type having disintegrating mechanism fed by a horizontal conveyor, with structure which may be actuated as the last remnant of the mass approaches the disintegrating mechanism to stabilize the remnant against tipover and to forcibly push the same into the mechanism.

Another important object of our invention is to have the machine seperable into two independent units, one a processing or disintegrating unit and the other a stack transporting unit, such that when separated, the units may perform their individual unrelated functions in the most efficient manner.

In the drawings:

FIG. 1 is a longitudinal cross-sectional view of a machine constructed in accordance with the present invention and capable of carrying the novel method, portions of the machine being shown diagrammatically for clarity;

FIG. 2 is a partial cross-sectional diagrammatic view of the machine showing the processor and swinging structure;

FIG. 3 is a top plan view of the machine;

FIG. 4 is a transverse cross-sectional view of the machine taken along line 4—4 of FIG. 1; and FIG. 5 is an enlarged, partial, transverse cross-sectional view taken along a line passing through the swinging structure and looking forwardly.

A stack moving and processing machine broadly designated by the numeral 10 has a forwardly extending tongue 12 for connection with a towing vehicle (not shown) as well as a drive shaft 14 adapted for interconnection with a power takeoff such as commonly found in conventional towing vehicles. Although the machine 10 as shown in the preferred embodiment is adapted to be trailed behind a towing vehicle, it is to be understood that the invention may be embodied in a self-propelled machine, as well as a machine adapted for stationary use.

The forward end of machine 10 is provided with a processor 16 having a frame 18 secured to tongue 12 and supporting a bank of conventional processing rolls 20. Frame 18 is rendered mobile by a pair of spaced ground-engaging wheels 22 mounted on frame 18 for rotation about a transverse axis.

The bank of processing rolls 20 extends upwardly and forwardly with each roll 20 being supported upon its own transversely extending axle 24 for rotation respectively in the directions shown by the arrows in FIG. 1. A transversely extending auger 26 is disposed generally forwardly and below the bank of rolls 20 for receiving material shredded by the latter and conveying the material transversely.

Rolls 20 and auger 26 are enclosed by a housing 28 having an open side facing rearwardly for admitting material to the bank of rolls 20, and a pair of side panels 30 diverging outwardly from housing 28 for guiding material received by the processor 16. Rolls 20 and auger 26 are interconnected to shaft 14 through transmission 32 and a drive train (not shown) such that the rolls 20 are poweredly driven in the directions indicated in FIGS. 1 and 2, and auger 26 is rotated to move material received thereby laterally.

Housing 28 has a cutout 34 in the sidewall adjacent the delivery end of auger 26 to provide an exit for the shredded material from the processor. In order to augment the action of auger 26, a trough 36 is disposed beneath the latter extending substantially the entire length thereof such that shredded material will be collected for ready transport by the auger 26. Also in the interest of increasing efficiency, the lowermost roll 20 is provided with an underlying panel 38 complementing the latter and extending the length thereof such that any shredded material which is not presented to auger 26 will be reintroduced into the bank of processing rolls 20.

An elongate bed 40 disposed immediately behind processor 16 is carried upon a mobile frame 42 having a pair of laterally spaced-apart ground-engaging wheels 44 mounted thereupon for rotation about a transverse axis. Bed 40 has a plurality of elongate, parallel, fore-and-aft extending rails 46 held in laterally spaced relationship by a pair of transversely extending beams 48. Each rail is provided with an endless element 50 trained longitudinally therearound to present a conveyor for moving supported material fore-and-aft of bed 40.

Bed 40 is pivotally secured to frame 42 by a pair of horizontal pintles 54 positioned approximately mid-length of the bed 40 so that the latter may be swung about a transverse horizontal axis between the positions shown in FIG. 1. A hydraulic cylinder assembly 56 extends between frame 42 and the forwardmost beam 48 to effect powered swinging of the bed 40. A pair of conventional crawler units 58 are positioned on the underside of the bed 40 adjacent the rearmost end of the latter and adapted for engaging the ground when bed 40 is swung to its tilted position as shown in FIG. 1.

Drive means for endless elements 50 and crawler units 58 is presented in the form of a hydraulic motor 60 carried on the rearmost beam 48. A chain and sprocket assembly 62 interconnects motor 60 with a transversely extending power shaft 64 coupled to each endless element 50. A second chain and sprocket assembly 66 couples shaft 64 with the crawler units 58 in a manner not shown for driving units 58 in a direction opposite to the movement of endless elements 50.

The forwardmost end of frame 42 has a tongue 68 that extends forwardly beneath processor 16 and is pivotally secured to the forwardmost end of frame 18 by a clevis and pin assembly 70 such that frame 42, and consequently bed 40, is detachable from processor 16. Thus, when detached, either the processor 16 or the bed 40 may be used independently of the other. The lateral movement of frame 42 relative to frame 18 is limited by a pair of opposed, upstanding retainers 72 mounted on the rearmost end of frame 18 and adapted for engaging opposite sides of forwardly tapering frame 42 as best shown in FIG. 3.

Frame 42 is secured to frame 18 in such a manner as to dispose the forwardmost end of bed 40 in close proximity to the processor 16, and interposed between bed 40 and the processor 16 is a swinging lift structure 74 carried by frame 18. Structure 74 includes a transversely extending rod 76 having four parallel, laterally spaced, rearwardly extending inner tines 78, and a pair of similarly disposed outer tines 80 extending from the opposite outermost ends of rod 76.

Each tine 78 comprises a substantially flat, rectangular upper section 82 reinforced along its length by an under-carried reinforcing channel 84 which extends substantially the length of upper section 82. The longitudinal edges of section 82 each have flexible skirt members 86 extending outwardly therefrom along the length of section 82. Each outer tine 80 is constructed so as to resemble a longitudinally bisected tine 78. Consequently, tines 80 have structure corresponding to upper section 82, reinforcing channel 84 and resilient skirt member 86.

A pair of sleeves 88 rigidly secured to opposite sides of frame 18 receive rod 76 permitting swinging movement of the latter and tines 78, 80 relative to processor 16 and bed 40. The sleeves 88 dispose rod 76 in such a manner that tines 78, 80 extend parallel to rails 46 with tines 78 being nested within respective spaces between adjacent rails 46 when the structure 74 is in its lowermost position.

As shown in FIG. 2, structure 74 is rendered poweredly swingable by virtue of a hydraulic cylinder assembly 90 which extends between frame 18 and a crank 92 on rod 76. As a result, structure 74 is capable of exerting a lifting force between its material-receiving position shown in FIG. 1 wherein tines 78 are nested between rails 46 and a feeding position shown in FIG. 2 wherein tines 78, 80 are in close proximity to the bank or rolls 20.

In operation, the machine 10 is moved by a draft vehicle to a position in the field wherein the rearmost end of bed 40 is adjacent a stack desired to be moved and/or processed. Cylinder 56 is actuated to swing bed 40 from its normally horizontal position to a rearwardly tilted position shown in phantom in FIG. 1 wherein crawler unit 58 comes into engagement with the ground. Actuation of motor 60 then causes simultaneous opposite movement of endless elements 50 and crawler units 58 so that the elements 50 draw the mass up onto bed 40 as crawlers 58 progressively pull bed 40 under the mass. This operation is continued until the entire crop mass is supported upon bed 40 whereupon cylinder 56 is actuated to return the bed to its normal horizontal transport position.

At this point, depending upon the desires of the operator, the loaded crop mass is either transported to a new location for unloading, or moved to a livestock feeding area for disintegration and distribution. Should it be desired to merely relocate the stack, the machine is moved to the new location with the crop carried intact thereupon, and the above described loading operation is carried out in reverse to remove the stack from the bed 40 in an undisturbed manner; that is, cylinder 56 is actuated to tilt the bed 40 supporting the crop mass to an inclined position whereupon motor 60 is actuated in reverse to move endless elements 40 rearwardly while at the same time actuating crawler units 58. This simultaneous operation causes the stack to be progressively and gently lowered onto the desired new location with little or no disturbing effect upon the crop mass itself.

On the other hand, should it be desired to disintegrate the crop mass for feeding livestock, the machine 10 is simply moved to the designated feeding area and the drive shaft 14 is actuated to effect powered rotation of the rolls 20 and auger 26 whereupon forward actuation of endless elements 50 continuously moves the crop mass into the bank of rotating rolls 20.

As the crop mass is progressively received by the rolls 20, it is aggressively disintegrated with the separated material being thrown forwardly by the rolls 20 and subsequently gravitating to auger 26 and trough 36. The separated material is continuously moved through cutout 34 by operation of the auger 26 and the continuous stream of material flowing from cutout 34 can best be utilized by simultaneously advancing machine 10 to thereby produce a uniform row of livestock feed.

The horizontal feeding to processor 16 is continued until there remains only a remnant of the crop mass disposed substantially over structure 74. This remaining portion is extremely susceptible to rearward tipping in response to further actuation of elements 50 and engagement with rolls 20, so structure 74 is actuated by cylinder assembly 90 to lift the remnant portion from bed 40 and forcibly feed the same into rolls 20. It will be seen that as structure 74 is progressively swung to its feeding position, tines 78, 80 and the bank of rolls 20 form a U-shaped confine with the remaining portion of the crop mass tending to be forced into the bight of the U-shaped confine by virtue of its own weight. Consequently, the subsequent feeding is extremely well controlled, there being very little likelihood that the remaining portion would be able to escape the confines between the structure 74 and the bank of rolls 20.

It is important to note that the present invention allows use of processor 16 independently of bed 40 and vice versa. In this regard, the operator need merely release clevis and pin assembly 70, thereby disconnecting frames 18 and 42 when he desires to use either the processor 16 or the bed 40 as an independent machine. Thus, should it be desired to process small round bales or the like instead of large crop masses, processor 16 is available for use in conjunction with structure 74 carried upon frame 18 to efficiently process the smaller units of crop material. Of course, the bed 40 would also be available for independent use by merely connecting tongue 68 to a towing vehicle and then operating the bed 40 as a mover alone.

Having thus described the invention, what is claimed as new and desired to be secured by Letters Patent is:

1. A method of reducing a large mass of crop material including the steps of:
    engaging an upstanding crop mass from beneath the latter with a horizontally moving conveying force to advance the mass in the direction of movement of said conveying force;
    continuing said advancement of the mass using said conveying force only as the mass is progressively delivered into the mechanism for shredding the same;
    passing said mass over a standby source of swingable lifting force on the way to said mechanism; and
    after shredding most of the original mass using said conveying force only, restraining the remaining portion of the upstanding mass against tipover and feeding the same into the mechanism using said swingable lifting force only.

2. A method as claimed in claim 1, wherein all of the said steps are carried out while the mass is being transported and the shredded material is being discharged in a continuous stream.

3. A machine for handling large crop masses including:
    an elongate, horizontally disposed flat bed adapted to carry said crop masses;
    an upright crop processor adjacent one end of the bed for progressively shredding a mass of crop material presented thereto,
    said bed having a plurality of laterally spaced, load-supporting rails extending between the opposite ends of the bed;
    an endless conveying element looped longitudinally around each of said rails, respectively, each element presenting an upper working stretch movable toward said processor from the opposite end of the bed in unison with corresponding stretches of the other elements for the purpose of delivering a mass along the rails into the processor; and
    a lift at said one end of the bed held against longitudinal displacement relative to the latter during operation in disposition for a mass to pass over the same during its delivery by said elements to the processor,
    said lift including a plurality of longitudinally extending tines interdigitated between said rails and said elements in a manner to avoid interference with a mass moving along said beams above the tines,
    said lift further including means for selectively operating said tines to swing the same in unison from said interdigitated position to a raised, feeding position for lifting a final portion of the mass off the bed and into the processor.

4. A machine for handling large crop masses as claimed in claim 3, wherein said bed, processor and lift are carried by a mobile frame having ground-engaging wheels.

5. A machine for handling large crop masses as claimed in claim 4, wherein said bed is tiltable about a horizontal transverse axis between a normally horizontal position and a loading position wherein the other end of said bed is adjacent the ground for loading ground-supported crop masses onto the bed.

6. A machine for handling large crop masses as claimed in claim 5, wherein said bed has a crawler unit adjacent said other end, disposed to engage the ground when the bed is tilted to its loading position.

7. A machine for handling large crop masses as claimed in claim 3, wherein said processor includes lateral transport means for discharging shredded crop from the machine.

8. In a machine for handling large masses of crop material, the combination comprising:
    a mobile crop processor including a bank of shredding rolls;
    a mover having a normally horizontal, tiltable bed for loading and transporting a crop mass and a conveyor on said bed; and
    means detachably coupling said processor and said mover in tandem and in such a relationship that one end of said conveyor is disposed adjacent said bank for delivering crop material supported on said bed to said processor,
    said processor and said mover each being provided with a pair of ground-engaging wheels rotatable about respective transverse axes,
    said mover being disposed behind said processor and having an elongate, forwardly extending tongue,
    said coupling means securing said tongue to said processor frame forwardly of said wheels,
    one of said pairs of wheels being disposed inboard of the other pair, said inboard pair of wheels being partially disposed within the space between said other pair of wheels.

9. In a machine for handling large masses of crop material, the combination comprising:
    a mobile crop processor, including a forwardly carried bank of shredding rolls;
    a mover having a normally horizontal, tiltable bed for loading and transporting a crop mass and a conveyor on said bed;
    means detachably coupling said mover in tandem behind said processor and in an overlapping relationship thereto whereby one end of said conveyor is disposed adjacent said bank for delivering crop material supported on said bed to said processor; and
    a pair of ground-engaging wheels for said processor and said mover, respectively, said pairs being rotatable about respective transverse axes,
    said processor including retaining structure for limiting lateral movement between said mover and said processor.

* * * * *